G. A. KEENE.
Improvement in Paddle-Wheels.
No. 132,013.  Patented Oct. 8, 1872.
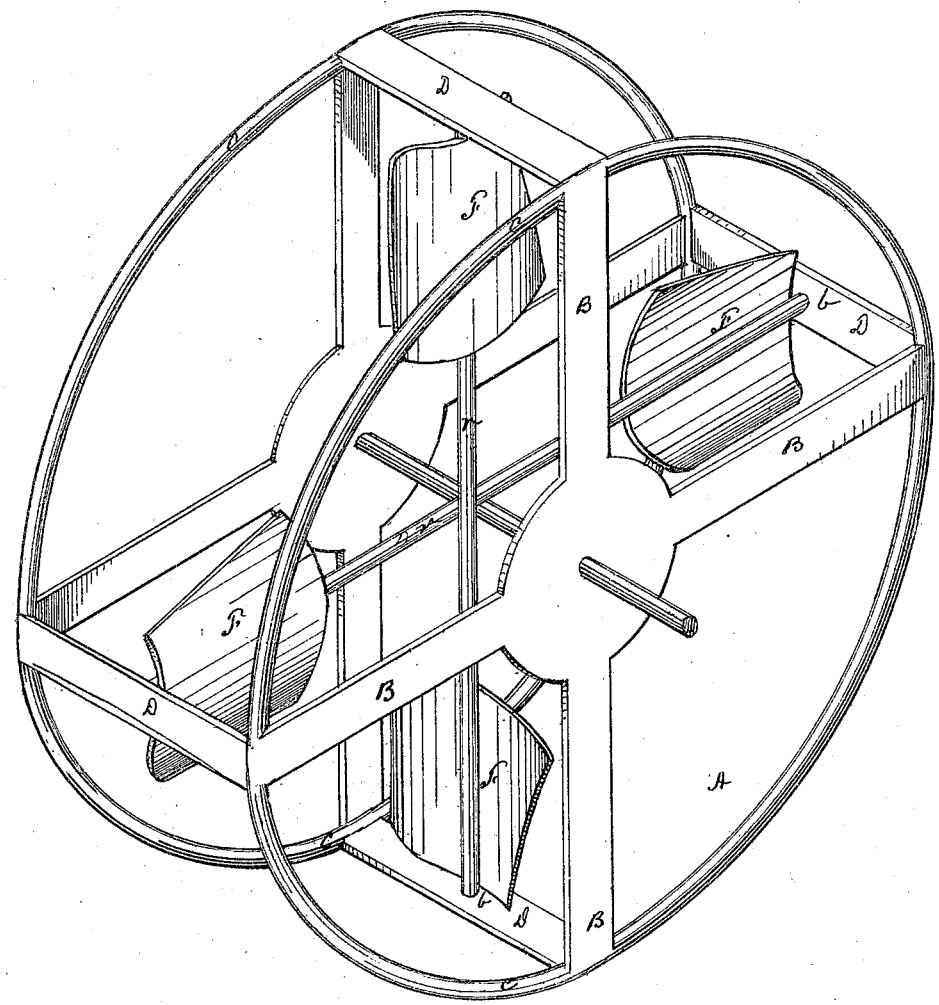

UNITED STATES PATENT OFFICE.

GEORGE AUGUSTUS KEENE, OF LYNN, MASSACHUSETTS.

IMPROVEMENT IN PADDLE-WHEELS.

Specification forming part of Letters Patent No. 132,013, dated October 8, 1872.

*To all whom it may concern:*

Be it known that I, GEORGE AUGUSTUS KEENE, have invented a new and useful Improvement in Feathering Paddle-Wheels, of which the following is a specification sufficient to enable one skilled in the art to construct and use my said invention.

The drawing represents a perspective of my improvement.

The nature of my invention consists, first, in arranging and fixing concave paddles upon a pivoted rod, so that each paddle shall present, in any area, bounded by a line vertical to the rod, unequal areas on the opposite sides of the pivoted line, and that similar cords in the opposite paddles upon the rod shall be nearly at right angles with each other; also, in certain arrangements to render this construction more efficient and cheap.

A is the wheel composed of rim C, spokes B, and cross-bar D. Shaft S runs clear across. The cross-bars are so spaced about the wheel that a cord drawn from any one to the most nearly opposite bar shall be the chord of an arc, whose sine is at least the diameter of shaft S, plus the semi-diameter of rod $r$—in other words, the centers of the boxes for the rods $r$ in the cross-bars must be at least as far on one side of a diameter of the wheel as half the thickness of the shaft and half the thickness of the rod. If we put a bearing on the shaft for the rod we must add the thickness of that also. Rods $r$ rest in bearings $b$ in cross-bars D, and upon them are placed floats F. These are cylindrical segments, bounded either by right or curved lines, and disposed so that the rods $r$ are coincident with the direction of the cylinder, with unequal areas on either side of the rods $r$, and any chord of either segment is at or nearly at right angles with the similar chord of the segment at the opposite end of the rod.

Effect.

By this arrangement the float enters the water more nearly edgewise and emerges more nearly edgewise than a plain float, and takes a better hold of the water. Construction is simplified by arrangement of the rods past instead of through the shaft, and all the bearing necessary can be fixed to the shaft either as a bearing-collar or an attached box. Alteration of old wheels into my wheel can be made, and a cross-bar placed not only across the rim but wherever a bearing is desirable, thus strengthening as well as simplifying and cheapening construction.

I claim and desire to secure by Letters Patent—

1. The rods $r$ having arranged at either end of the same cylindrical segments F, presenting to the water, at any immersion where the rod $r$ is at right angles with the water-line, unequal areas on either side of rod $r$, and so shaped that similar chords in the opposite segments are nearly at right angles with each other, substantially as and for the purpose described.

2. The arrangement of spokes B and cross-bars D carrying bearings for rods $r$, extending past the shaft and across the wheel, and carrying a pair of opposite floats, substantially as described.

GEO. A. KEENE.

Witnesses:
   THOS. WM. CLARKE,
   JOHN HALEY.